W. A. TURBAYNE.
REGULATOR FOR ELECTRIC GENERATORS.
APPLICATION FILED MAY 13, 1914.
1,251,708.
Patented Jan. 1, 1918.
2 SHEETS—SHEET 2.
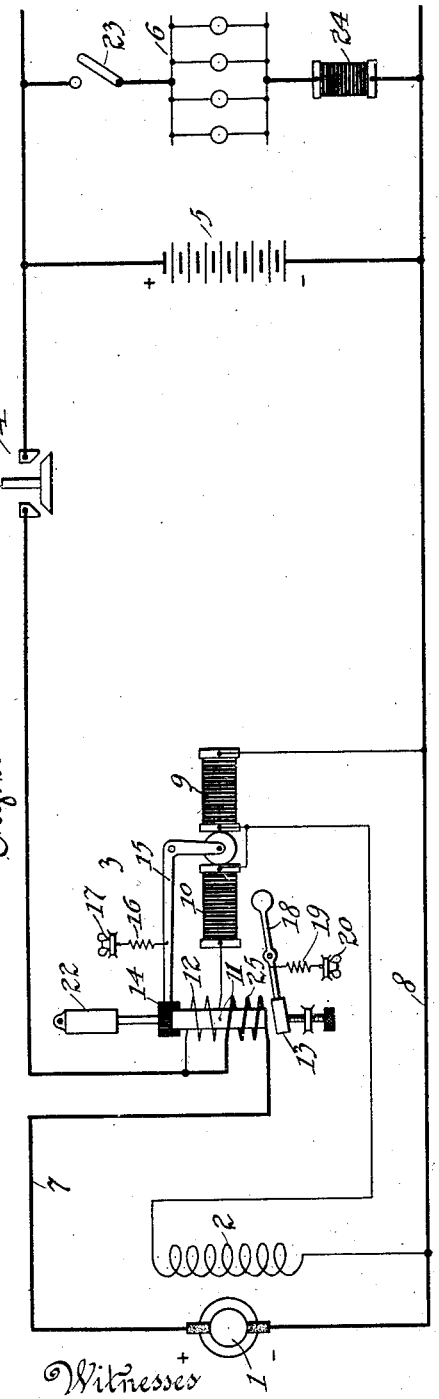
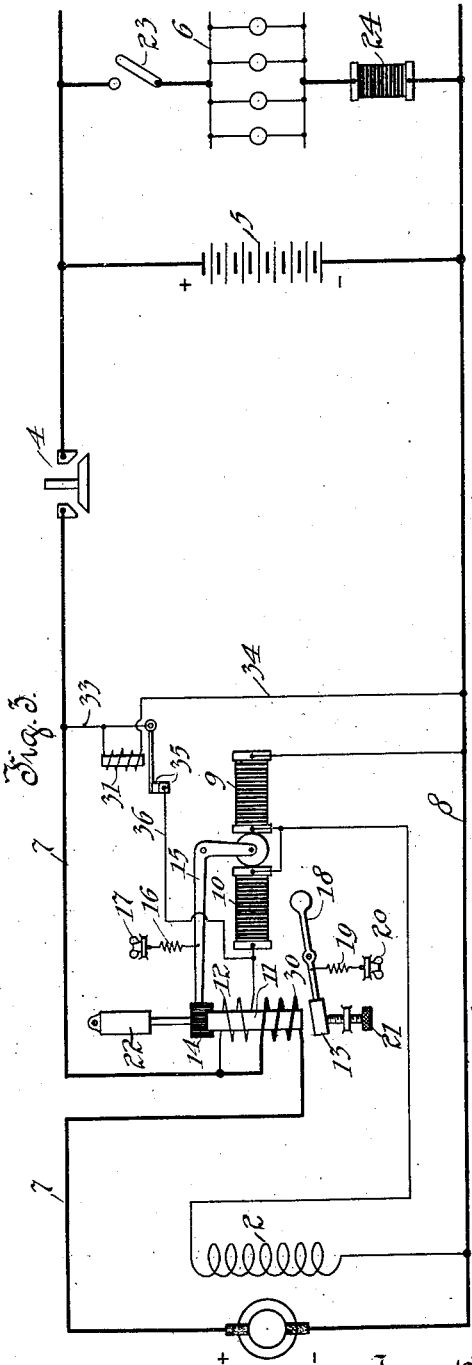
Witnesses
Robert H. Weir
R. H. Van Nest
Inventor
William A. Turbayne
by Edwin B. H. Tower Jr.
Atty.

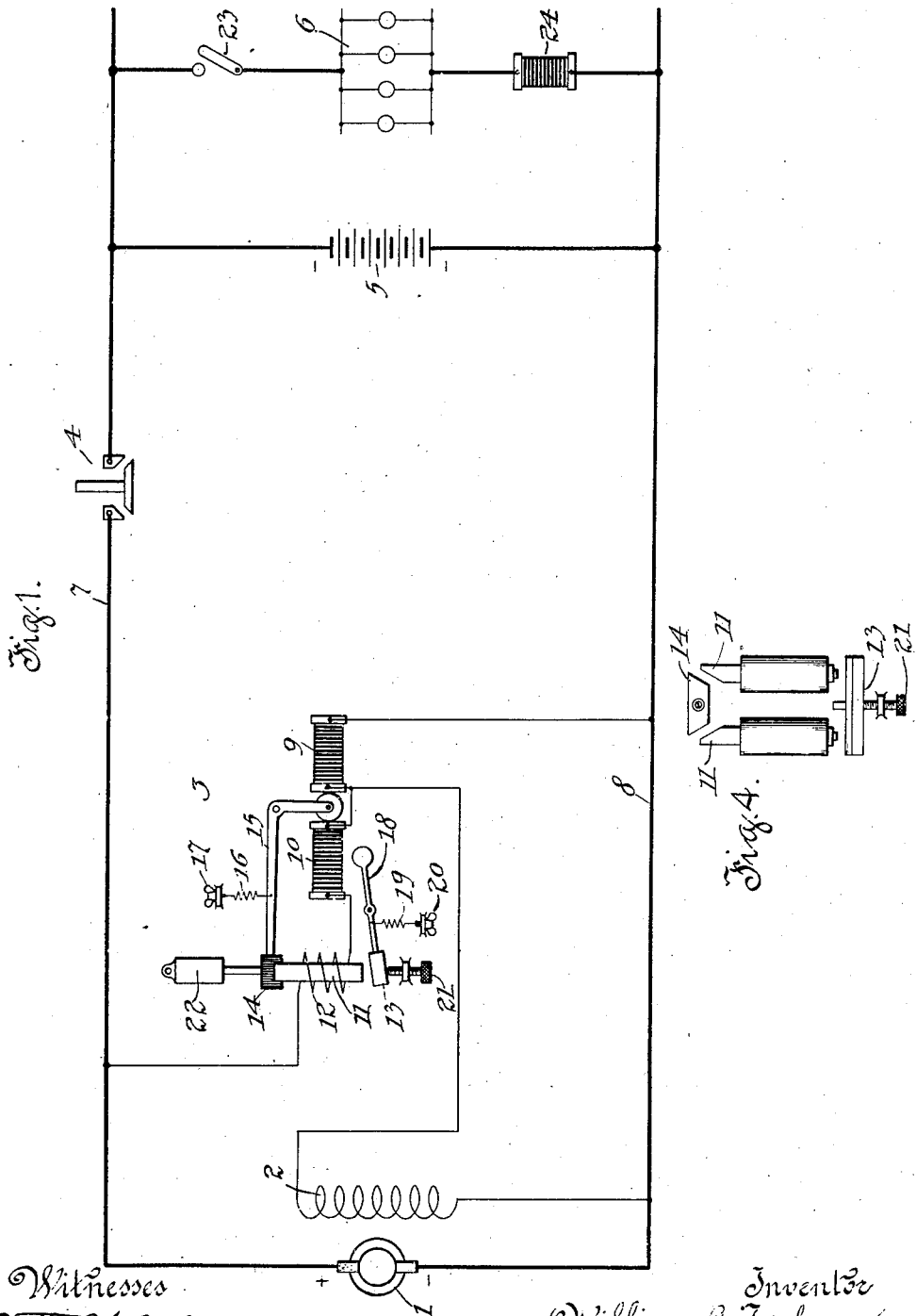

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

REGULATOR FOR ELECTRIC GENERATORS.

1,251,708.  Specification of Letters Patent.  Patented Jan. 1, 1918.

Application filed May 13, 1914. Serial No. 838,231.

*To all whom it may concern:*

Be it known that I, WILLIAM A. TURBAYNE, a citizen of the United States, residing at Niagara Falls, in the county of Niagara and State of New York, have invented new and useful Improvements in Regulators for Electric Generators, of which the following is a full, clear, concise, and exact description, reference being had to the accompanying drawing, forming a part of this specification.

This invention relates to regulators for electric generators.

The invention is especially applicable to variable speed battery charging generators, such as are employed in railway car lighting and automobile starting and lighting systems, although the invention is not limited to such use and may be employed under other conditions and in other relations.

An object of the invention is to provide an improved regulator for a variable speed generator, which will automatically be brought into action under definite predetermined electrical conditions, and which will thereafter maintain close generator regulation over wide ranges of speed.

Another object of the invention is to provide a voltage regulator for a generator, in which a controlling coil for the regulator is connected in the generator shunt field circuit and is automatically brought into action under predetermined conditions to control the generator regulation.

Another object is to provide an improved regulator which is inoperative until a predetermined generator output has been reached.

Certain of the broad features herein described have been described and claimed in a co-pending application, Serial No. 733,037, filed by me November 23, 1912.

Three embodiments of the invention are illustrated in the accompanying drawings in which—

Figure 1 is a diagram of one system employing the invention for securing constant voltage regulation;

Figs. 2 and 3 represent diagrammatically modified systems, and

Fig. 4 is a fragmentary detail of the cores and armatures of the regulating magnet.

In Fig. 1 a variable speed generator is provided with an armature 1 and a shunt field 2 controlled by a regulator 3. A battery 5 and lamps, or other translating devices 6, are connected in parallel branches across the generator leads 7 and 8. An automatic switch 4, of any preferred type, connects the generator to the battery and lamps when the generator attains a proper voltage.

The regulator 3 includes a compressible rheostat 9 in shunt to the generator field and a compressible rheostat 10 in series with the field and rheostat 9. These rheostats are preferably arranged end to end in alinement. An electromagnetic winding 12 in series with the field winding 2 and rheostats 9 and 10 is adapted under predetermined electrical conditions, hereinafter described, to control the rheostats 9 and 10 by means of an armature 14 on a bell crank lever 15, having an operating arm arranged between the adjacent ends of the rheostats 9 and 10. The bell crank lever is normally held in position to exert a maximum pressure on rheostat 10 and a minimum pressure on rheostat 9 by means of a spring 16, adjustable by a wing nut 17. A dash pot 22 steadies the action of the bell crank lever.

The regulator is so constructed that its controlling winding is incapable of operating the rheostats as long as current below a predetermined value is flowing through the magnet winding. This provision is made in order that the regulator may not operate to insert resistance in the generator field while the generator speed is low, and thus prevent the generator from building up quickly. This result is obtained by constructing the regulating magnet in substantially horseshoe form with parallel cores 11 and armatures 13 and 14 coöperating with opposite ends of the cores. The reluctance of the magnetic circuit of this magnet is so great that at ordinary values of current through the winding 12, the armature 14 is beyond the magnetic field of the magnet and is, therefore, not influenced thereby. The armature 13 is mounted on a lever 18 which is statically balanced. That is, the lever is counter-balanced and supported near its center of mass so that any jar or vibration will effect both ends of the lever to the same extent and will not cause the armature to swing about its pivot. The armature is normally held retracted from the cores 11 by means of a spring 19, adjustable as by the wing nut 20, and an adjustable stop 21, determines the air gap between the armature and the cores. The tension of the spring 19 and the stop 21 are so adjusted that upon a predetermined current in the coil 12, the armature 13 will be attracted to the cores. Attraction of the armature 13 will so reduce the magnetic reluctance of the magnet field that its radius of action will include the armature 14. Any further increase in current in the magnet winding will attract the armature 14 and thereby operate the regulator.

A switch 23 controls the lamp circuit, and a regulator 24, of any preferred type, may be arranged to maintain constant voltage across the lamps.

The variable resistances have been illustrated as of the compressible type, wherein a number of electrodes in the form of disks of carbon, or other material, are arranged to vary the resistance of a circuit by variations in pressure on the electrodes, but it is evident that many other types of variable resistances may be employed.

Starting with the generator at rest, the automatic switch will be open, the armatures 13 and 14 will be retracted from the cores 11, and the bell crank lever will be held by the spring 16, so as to decrease the resistance of rheostat 10 in series with the field to a minimum, and increase the resistance of rheostat 9 in shunt to the field to a maximum. Upon rotation of the armature the generator field will rapidly build up and at the proper voltage the automatic switch will close. When the generator voltage has increased to the predetermined voltage of the system, a sufficient current will flow through the coils 12 to attract the armature 13, thereby so reducing the reluctance of the magnet that the armature 14 is brought within its sphere of influence.

Further increase in generator speed will result in attraction of the armature 14, thereby decreasing the pressure on the compressible rheostat 10 and proportionately increasing the pressure on the rheostat 9. This will increase the resistance in series with the field and at the same time divert more current from the field by decreasing the resistance in shunt thereto. The adjustment is preferably such that a practically constant current will be maintained through the coils 12, the current only departing from constancy sufficiently to effect regulation. The coils 12 will thus act similarly to coils connected in series with a circuit through which it is desired to maintain a constant current. A constant current through coils 12 in fact presupposes constant voltage across the generator, inasmuch as any increase in generator voltage will immediately tend to increase the current in the coils, resulting in a weakening of the field excitation to restore normal conditions. Such conditions will be maintained regardless of speed changes of the generator.

Fig. 2 illustrates a similar system in which, however, a current coil 25 is added which acts cumulatively with the coil 12. The effect of coil 25 is to prevent excessive current in the event that the battery 5 has been discharged to such an extent that its voltage has dropped to a very low value. The coil 25 will bring the regulator into operation on any tendency of the generator to supply an excessive amount of current to the system. Otherwise, the operation of the system illustrated in Fig. 2 is the same as that illustrated in Fig. 1.

Obviously the systems illustrated in Figs. 1 and 2 will provide a taper charge for the battery.

Fig. 3 illustrates a system in which charging current for the battery will be substantially discontinued at a predetermined voltage across the system. In this system the coil 12 is short-circuited and consequently is ineffective as a regulating coil as long as the battery is below the predetermined maximum voltage which it is desired to permit on the system. A relay 31 is connected across the main line through conductors 33 and 34, and controls the short circuit around the coils 12, by means of contacts 35 in conductor 36. Coil 30 will thus operate to maintain substantially constant current after a certain predetermined generator output has been reached, until the voltage has risen to the predetermined voltage which may represent substantially the full charge voltage of the battery. At this point relay 31 operates to open the short-circuit around the coils 12. Coils 12 will now predominate in the regulation and bring the generator voltage down to a sufficiently low value to practically reduce the charging current to zero.

In each of the systems illustrated, the regulation of the generator will be maintained regardless of speed changes and regardless of whether the battery circuit is open or otherwise.

In the systems illustrated in Figs. 1 and 2, the generator output will automatically increase to take care of increase in load due to turning on more lamps, or due to the demands of the battery, except that in Fig. 2 the current coil 25 will exert a limiting effect to prevent abnormal overload on the generator.

In the system illustrated in Fig. 3, constant current will be maintained until the predetermined voltage is reached, after which a substantially constant voltage will be maintained.

By the improvements herein described a generator regulator is provided which is incapable of affecting the generator until predetermined electrical conditions have been obtained. The generator is, therefore, free to rapidly build up as a simple shunt machine without interference from the regulator, which might otherwise tend to cut down the field excitation at low generator speeds and interfere with the rapid building up of the machine. At a point which may be accurately predetermined the regulator will automatically come into operation and will thereafter accurately regulate the generator throughout varying conditions of speed or load.

The embodiments of the invention herein described are merely for the purposes of illustration and it is obvious that various changes in the arrangement and construction of parts may be made without departing from the invention which is defined in the appended claims.

What I claim as new and desire to secure by Letters Patent of the United States, is:

1. In combination with a generator provided with a shunt field, a variable resistance in circuit with said field, a variable resistance in shunt to said field, common operating means therefor adapted to increase one of said resistances and simultaneously decrease the other in proportion, said operating means being controlled by a coil in series with said first mentioned resistance and being normally insensitive to current flowing through said coil, and means to render said operating means sensitive.

2. In combination with a generator provided with a shunt field, a variable resistance in the shunt field circuit, a variable resistance in shunt to said field, a coil in series with said shunt field and said circuit in shunt to said field, means operated by said coil to simultaneously increase said first mentioned resistance and proportionally decrease said second mentioned resistance, thereby varying the resistance of said shunt field circuit and maintaining constant the resistance in series with said coil, said last mentioned means being normally insensitive to current flowing through said coil, and means to render said means sensitive.

3. In combination, a variable speed shunt wound generator, a circuit in shunt to the generator field, a variable resistance in said circuit, a variable resistance in series with the shunt field and circuit in shunt thereto, an operating coil for said resistances in series with the said last mentioned variable resistance, said coil being normally ineffective to vary said resistance, and means for rendering said coil effective.

4. In a regulator for a shunt wound generator, a variable resistance in circuit with the shunt field thereof, a variable resistance in shunt to said field, operating means for said resistances, said operating means being controlled by a coil in series with said first mentioned resistance assisted by a coil in series with the generator, said operating means being normally unresponsive to variations of current flowing through said coils, and means operated by a predetermined value of current through said coils to render said operating means responsive.

5. In a system containing a generator having a shunt field winding, a variable resistance through which said field winding is connected across said generator, a variable resistance in shunt to said field winding, electromagnetic means for operating said variable resistances, said electromagnetic means having a winding connected in series with said first-mentioned resistance, said electromagnetic means being insensitive to current flowing through its winding, and means to render said electromagnetic means sensitive.

6. In combination with a shunt wound generator, a storage battery and lamps supplied thereby, regulating means for the generator, operating means for said regulating means comprising a coil in circuit with the shunt field winding and a coil in series with the generator, said coils being normally ineffective to operate said regulator, and means to render said coils effective to operate said regulator upon the attainment of predetermined current through either of said coils.

7. A regulator for a shunt wound generator including a variable resistance through which the shunt field winding is connected across said generator, an electromagnet in series with said resistance having an armature for controlling said variable resistance, said armature being unaffected by the variations in current through the winding of said electromagnet, and means to render said armature sensitive to control by said electromagnet in accordance with the current flowing through said winding.

8. A regulator for a shunt wound generator including a variable resistance for controlling the current through said winding, an electromagnet having a winding in series with said resistance, and an armature to control said variable resistance, said electromagnet having a magnetic reluctance whereby said armature is insensitive to current changes through said winding, and means to decrease said magnetic reluctance to render said electromagnet operative to control said armature.

9. A regulator for a shunt wound generator including a variable resistance controlling the current flowing through said shunt field winding, an electromagnet having a winding in series with said resistance, an armature for controlling said resistance but normally unresponsive to variations of current flowing through said winding, and means operated by a predetermined value of current flowing through said winding to increase the power of said electromagnet to render the armature thereof sensitive to changes of current through said winding.

10. A regulator for a shunt wound generator including a variable resistance through which the shunt field windings are connected across said generator, an electro-magnet in series with said resistance having an armature for controlling said variable resistance, said electro-magnet also including a current coil adapted to respond to an excess of current from the generator, said armature being normally unaffected by the variations in current of the windings of said electro-magnet, and means to render said armature sensitive to control by said electro-magnet in accordance with current flowing through said windings.

11. Regulating means for a shunt wound generator including a variable resistance through which the shunt field is connected across the generator, an operating coil therefor in series with said resistance and shunt field, said coil being normally inoperative to vary said resistance, and means responding to a predetermined current flow through said coil for rendering said coil operative to vary said resistance.

12. In combination, a generator provided with a shunt field, a variable resistance through which said shunt field is connected across said generator, a variable resistance in shunt to said shunt field, a single operating coil for said variable resistances, said coil connected in series with said first-mentioned resistance and being normally inoperative to vary said resistances, and means responding to a predetermined current flow through said coil for rendering said coil operative to vary said resistances.

In witness whereof, I have hereunto subscribed my name in the presence of two witnesses.

WILLIAM A. TURBAYNE.

Witnesses:
W. G. HEIST,
J. E. CANNON.